A. A. SIMON.
POTATO PEELER.
APPLICATION FILED MAR. 13, 1917.
1,289,563.
Patented Dec. 31, 1918.
2 SHEETS—SHEET 1.
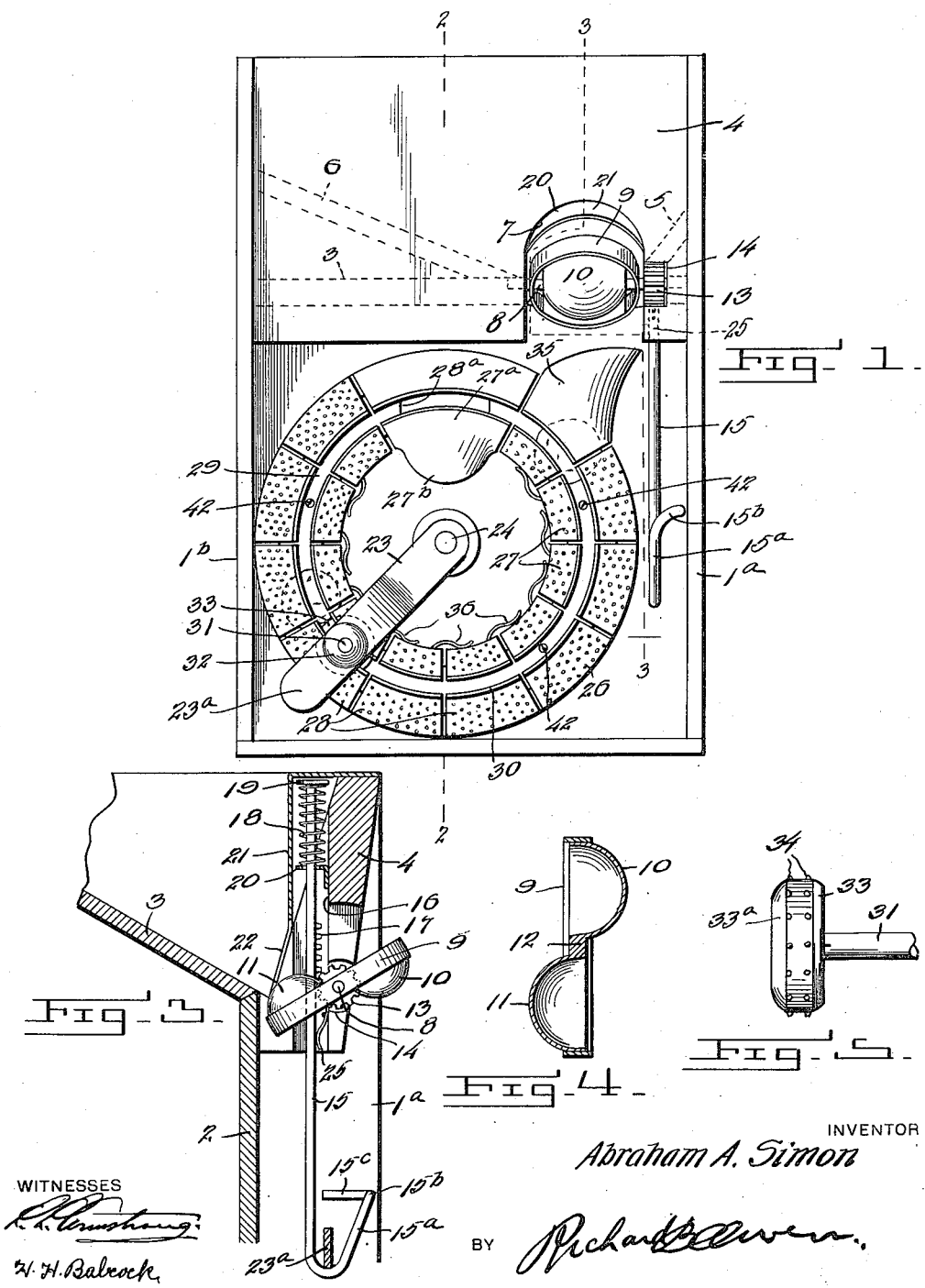
INVENTOR
Abraham A. Simon
WITNESSES
BY
ATTORNEY

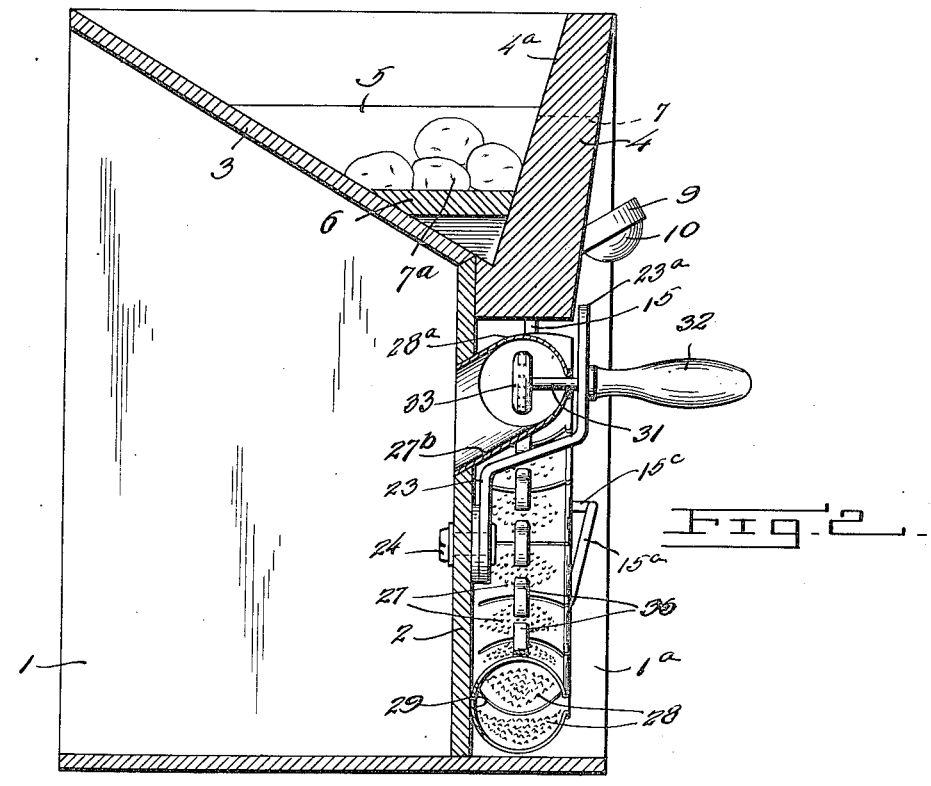
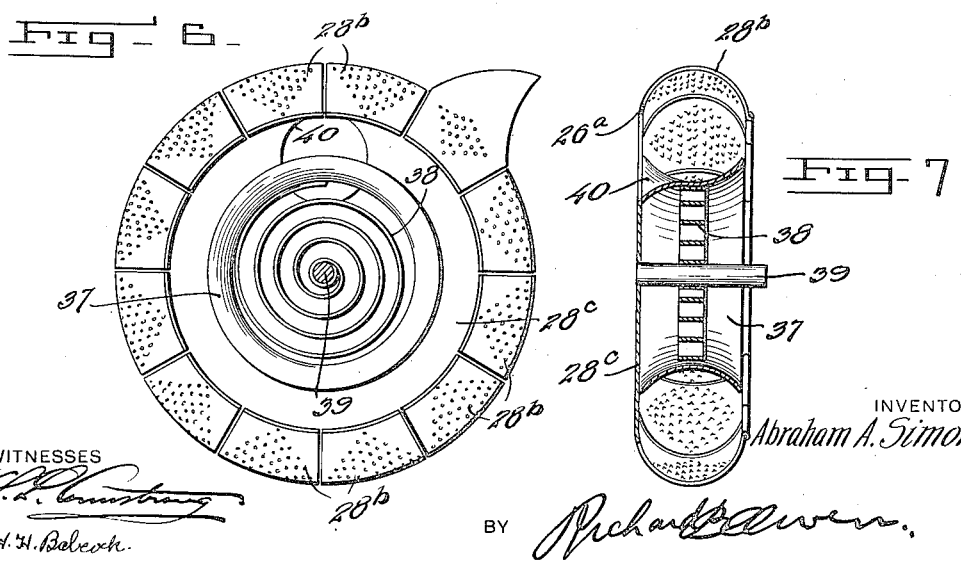

UNITED STATES PATENT OFFICE.

ABRAHAM A. SIMON, OF NEW YORK, N. Y.

POTATO-PEELER.

1,289,563.

Specification of Letters Patent. Patented Dec. 31, 1918.

Application filed March 13, 1917. Serial No. 154,513.

*To all whom it may concern:*

Be it known that I, ABRAHAM A. SIMON, a citizen of the United States, residing at New York, in the county of New York and State of New York, have invented certain new and useful Improvements in Potato-Peelers, of which the following is a specification.

This invention relates to potato peelers, and more particularly to an apparatus for peeling or scraping potatoes by forcing the same through a scraping tube or similar device.

One of the main objects of the invention is to provide a potato peeler of simple construction and operation having a scraping tube and means for forcing a potato through this tube, said means being adapted to actuate a feeding device whereby the potatoes are fed or dropped into the tube. A further object is to provide a peeler provided with a resiliently constructed tube to accommodate potatoes of different sizes and shapes. A still further object is to provide an operating handle and means carried thereby for engaging and rotating a potato as it is forced through the tube so as to insure that the entire surface of the potato will be subjected to the scraping action of the tube. Another object is to provide simple and efficient means for feeding the potatoes into the scraping tube. Further objects will appear from the detail description.

In the drawings:—

Figure 1 is a front view of a scraping machine constructed in accordance with my invention, Fig. 2 is a section taken substantially on line 2—2 of Fig. 1, Fig. 3 is a section taken on line 3—3 of Fig. 1, Fig. 4 is a central section taken through the feed cups and supporting frames therefor, Fig. 5 is a detail of the potato engaging disk, Fig. 6 is a front view of a modified form of peeling tube, Fig. 7 is a central vertical sectional view through Fig. 6.

The box-like casing 1 is provided, a short distance from its front edge, with a partition or board 2 extending the full width of the same. In the upper portion of this frame a downwardly and forwardly inclined board 3 is secured, the lower edge of this board being beveled to fit snugly against the upper edge of board 2, which is also beveled to provide a neat joint between these two members. Above board 2, at the upper end of the casing 1, is secured a front block 4. This block extends the full width of the casing and tapers upwardly, its inner face being inclined downwardly and inwardly as at 4ª. The downwardly and forwardly inclined board 3, and the block 4, constitute a receptacle for the potatoes to be peeled or scraped. At one side of the casing 1, adjacent the side wall 1ª thereof, a corner piece 5 is secured above and closely adjacent board 3. A similar corner piece 6 is secured adjacent the side wall 1ᵇ of the casing. These two corner pieces coöperate with the inclined board 3, and the inner face of block 4, to provide a receiving hopper for the potatoes 7ª, this hopper being so shaped as to direct the potatoes toward an opening 7 provided through front block 4 near one end thereof.

A shaft 8 is rotatably mounted in block 4 so as to extend across opening 7 approximately at the center of the same. A sheet metal frame 9 of substantially circular or ring shape is secured on this shaft. This frame supports two oppositely directed cups 10 and 11 secured therein and integrally connected by a central web member 12, these cups being disposed in axial alinement and having their axes in a plane at right angles to the axis of shaft 8. A pinion 13 is secured on shaft 8 adjacent frame 9, a suitable opening 14 being provided in block 4 to accommodate this pinion. A trip rod 15 is slidably mounted through a suitable bore 16 extending vertically through block 4. This rod is provided with an integral rack 17 adapted to mesh with pinion 13 so as to rotate the same when rod 15 is depressed. An expansion spring 18 is mounted about the upper portion of rod 15 and is confined between a disk 19 secured on the upper end of the rod and an angle bracket 20 secured on block 4 and apertured to accommodate the rod 15. The upper portion of trip rod 15, expansion spring 18 and bracket 20, are all inclosed by a sheet metal housing 21 secured to the block 4 and provided with an opening 22 which is in alinement with opening 7 of the block. By depressing rod 15 so as to rotate the shaft 8 and the cups 10 and 11, a potato will be permitted to fall through the opening 7 of block 4 into the scraping tube to be later described.

The tripping rod 15 is bent upward and outward at its lower end to provide a downwardly and inwardly inclined arm 15$^a$ which is turned outward as at 15$^b$ and then bent inward at right angles to provide a horizontal arm 15$^c$. This trip rod is positioned to be engaged by the outer rounded end 23$^a$ of an operating crank arm 23 the inner end of which is secured to a stub shaft 24 rotatably mounted through the front wall 2 of casing 1 at the center thereof. When the crank arm 23 is rotated in a clockwise direction the end portion 23$^a$ thereof, as it approaches the side 1$^a$ of casing 1, engages arm 15$^a$ so as to force the trip rod 15 outward against the action of the leaf spring 25 secured to block 4 and engaging rod 15 so as to normally hold the same pressed inward with the rack 17 out of engagement with pinion 14. When the outer end portion 23$^a$ of crank arm 23 reaches the lower end of arm 15$^a$ of the tripping rod, the tripping rod 15 has been forced outward so as to bring rack 17 into engagement with pinion 13 as in Fig. 3 of the drawings. As the rotation of the arm continues, rod 15 is forced downward so as to move the pinion through a half rotation, after which the outer end of the crank arm passes out of the hook at the lower end of the trip rod so as to release the same, the tripping rod being returned to its initial position by the action of expansion spring 18. During this downward movement of the trip rod the horizontal arm 15$^c$ thereof is in engagement with the inner face of the side wall 1$^a$ of the casing so as to positively limit the outward movement of the rod thus insuring accurate operation of the same. When the pinion 13 is thus rotated a potato is discharged from the hopper in the manner previously described.

A peeling or scraping tube designated generally by 26 is mounted on the front wall 1 of the casing concentric with shaft 24. This tube is formed from a continuous piece of sheet metal bent into approximately cylindrical shape in cross section. This tube is provided with a plurality of radially disposed slots so as to form a series of inner arms 27 mounted in closely adjacent spaced relation, and a similar series of outer arms 28, the arms 27 and 28 being integrally connected to an inner central web-portion 29. The arms 27 and 28 are turned outward at their upper ends to provide a central opening or channel 30 in the front of the tube 26. This channel 30 receives a rod 31 which is rotatably mounted through the crank arm 23, a suitable gripping element or handle 32 being secured on the outer end portion of this rod. A thick disk 33 is fixedly secured on the inner end of rod 31 and is provided at its central peripheral portion with a plurality of spaced gripping points or spikes 34. This disk is mounted within the tube 26 and is of such size as to move through the tube when the crank 23 is rotated. The inner face of disk 33 is rounded at its periphery as at 33$^a$ for a purpose to be disclosed.

Directly beneath the opening 7 through block 4 is a receiving hopper 35 stamped from one of the outer arms of the scraping tube. When a potato is discharged through opening 7 it falls into the hopper 35 which directs it into the tube 26 so as to occupy a position in the tube adjacent the lower end of hopper 35, as indicated in Fig. 1 of the drawings. When the crank 23 is rotated, the disk 33 will engage the potato so as to force it through tube 26. The arms 27 and 28 of this tube are provided on their inner faces with a plurality of scraping points formed by punching the metal with a pointed instrument, or in any other suitable manner, these points resembling closely the scraping elements of an ordinary grater used for culinary purposes. As the potato is forced though the tube it is subjected to the action of the scraping points of the resilient arms so as to have its coating or jacket removed. This operation is greatly facilitated by the disk 33 which, as the crank 23 is rotated by means of handle 32, will be rotated relatively to the crank. When the disk is thus rotated, the scraping points 34 thereof engage the potato so as to rotate the same as it is forced through the scraping tube thus insuring that the entire surface of the potato is subjected to the action of the scraping points.

An inner arm 27$^a$ of the scraping tube positioned at the top thereof is stamped to form a downwardly directed discharge chute 27$^b$ which extends through the front wall 2 of the casing. The uppermost outer arm 28$^a$ is of somewhat greater length than the remaining arms 28, and is of smooth contour not being provided with any scraping points, as is also the inner arm 27$^a$. As the crank arm 23 is rotated the body is forced about the tube so as to be thoroughly scraped and, as it approaches the top of the tube, falls into the discharge chute 27$^b$ of plate 27$^a$. As the potato moves inward toward the front wall 2 of the casing it is engaged by the inner rounded portion of disk 33 which acts to expel the potato through the discharge chute 27$^b$. The potato may be discharged directly into casing 1 or, if preferred, a suitable receptacle may be placed in the casing beneath the discharge chute, as will be obvious.

A bowed leaf spring 36 is secured to each of the inner arms 27 of the scraping tube adjacent the inner end thereof and overlaps the preceding arm 27, the free end of the spring being in engagement therewith. These springs act as reinforcing elements of the inner arms to prevent the same from getting out of their proper relative positions, but permitting sufficient resiliency or give of these members to accommodate potatoes of different sizes and shapes. As the arms 27 and 28 are all resilient, the tube 26 readily accommodates potatoes of different sizes and shapes, the arms of the tube being at all times held in close contact with the potato so as to thoroughly scrape the same and completely remove the jacket.

In Figs. 6 and 7 I have shown a modified form of scraping tube. In this form the tube 26$^a$ is provided with the outer arms 28$^b$ only, these arms being formed integral with a disk or base 28$^c$. This tube is mounted concentric with a broad sheet metal ring or collar 37 which is concaved transversely as at 37$^a$ to provide a peripheral groove. A spiral spring 38 is secured at its inner end to a post 39 fixedly secured in disk 28$^c$ and at its outer end to the collar 37 at the center thereof. This spring acts to normally hold the collar concentric with post 39 while permitting the collar to be displaced relatively to the post so as to accommodate potatoes of different sizes and shapes which are forced through the tube 26$^a$ about collar 37. The operation of this device is similar to that of the scraping tube 26 previously described.

The modified form of tube shown in Figs. 6 and 7 may be mounted on the front board 2 of the casing in the same manner as tube 26, the crank arm 23 being mounted on the outer end portion of post 39 for rotation about the same. The base 28$^c$ is provided with an opening 40 and a suitable discharge tube concentric therewith corresponding to the discharge chute 27$^b$ of tube 26. The operation of this tube is analogous to that of tube 26 and will be readily understood.

Scraping tube 26 may be secured to the front wall 2 of casing 1 by means of countersunk screws 42 passed through the web portion 29 of the same and threaded into front wall 2, or other suitable securing means may be provided. It will be evident that there may be slight changes made in the construction and arrangement of the different parts of my invention without departing from the field and scope of the same, and I intend to include all such changes, as fall within the scope of the appended claims, in this application in which a preferred form only of my invention is disclosed.

What I claim is:—

1. In potato peelers, an annular and expansible scraping tube, means for feeding the potatoes into said tube, means for forcing a potato through said tube and means for causing the discharge of the potato prior to approaching the feeding means and after passing through the tube, said forcing means being capable of continuous operation.

2. In potato peelers, a scraping tube having an inlet and a discharge, means for forcing a potato through said tube from the inlet to the discharge thereof and for simultaneously turning said potato so as to subject the entire surface thereof to the action of said scraping tube, and means for supplying potatoes to the inlet of said tube.

3. In potato peelers, a circular scraping tube provided with a plurality of opposed resilient arms having inwardly directed scraping points, said arms being disposed edge to edge, and means for forcing potatoes through said tube so as to be acted upon by the scraping points of said arms.

4. In potato peelers, a scraping tube provided with a plurality of opposed resilient arcuate arms having inwardly directed scraping points, means for forcing a potato through said tube and simultaneously turning the potato so as to subject the entire surface thereof to the action of the scraping points of said arms, and means actuated by the means for forcing a potato through the tube for feeding potatoes into said tube.

5. In potato peelers, a circular radially expansible scraping tube of round cross-section adapted to receive a potato and scrape the jacket from the same when the potato is forced through the tube, and means for forcing a potato through said tube.

6. In potato peelers, a scraping tube formed from a continuous piece of sheet metal and having a plurality of opposed arcuate scraping arms provided with inwardly directed scraping points, and means for forcing a potato through said tube.

7. In potato peelers, a scraping tube provided with a plurality of opposed resilient arcuate arms having inwardly directed scraping points, the outer ends of said arms being spaced apart to provide an outer operating slot, and a disk operable in said tube and adapted to engage a potato so as to force the same through said tube.

8. In potato peelers, a rotatably mounted crank arm, a scraping tube mounted concentric with the axis of said arm and having an inlet and a discharge opening, said tube being provided with an outer central slot, a rod inserted through said arm and extending into the scraping tube through said slot, and a potato engaging disk secured on the inner end of said rod and operable in the tube.

9. In potato peelers, a supporting casing, an operating arm rotatably mounted on the front wall of said casing, a radially expansible scraping tube fixedly secured on the casing concentric with the axis of rotation of said arm and provided with an outer central slot, said tube having inlet and outlet openings, a rod rotatably mounted through said arm and extending into said tube through the slot thereof, a handle secured on said rod in front of the arm, and a disk secured on the inner end of the rod and operable within the tube, said disk being provided with a plurality of radially disposed gripping points whereby, when the arm is rotated, a potato placed in the tube will be forced through said tube and simultaneously turned so as to have its entire surface subjected to the scraping action of the tube.

10. In potato peelers, a rotatably mounted arm, a radially expansible scraping tube fixedly secured concentric with the axis of rotation of said arm, and having an outer central slot, said casing being provided at its upper portion with a downwardly directed discharge chute and an upwardly directed receiving chute adjacent thereto, a rod rotatably mounted through said arm and extending through said slot into the scraping tube, a disk secured on the inner end of said rod, and means actuated by said arm for feeding potatoes into said receiving chute.

11. In potato peelers, a rotatably mounted arm, a radially expansible scraping tube fixedly secured concentric with the axis of rotation of said arm, and having an outer central slot, said casing being provided at its upper portion with a downwardly directed discharge chute and an upwardly directed receiving chute adjacent thereto, a rod rotatably mounted through said arm and extending through said slot into the scraping tube, a disk secured on the inner end of said rod, a hopper mounted above said tube and provided with an opening in vertical alinement with said receiving chute, a rotatably mounted shaft extending across said opening, oppositely directed cups secured to said shaft, and means actuated by said arm for moving said shaft through a half rotation for every complete rotation of said arm.

In testimony whereof I affix my signature in presence of two witnesses.

ABRAHAM A. SIMON.

Witnesses:
 JOHN E. BURCH,
 WILLIAM S. FOWLER.